US012576992B2

(12) United States Patent (10) Patent No.: US 12,576,992 B2
Ferrario et al. (45) Date of Patent: Mar. 17, 2026

(54) SATELLITE MODULE FOR ATTITUDE DETERMINATION

(71) Applicant: D-ORBIT S.P.A., Fino Mornasco (IT)

(72) Inventors: Lorenzo Ferrario, Fino Mornasco (IT); Marco Bevilacqua, Fino Mornasco (IT); Luca Zorzi, Fino Mornasco (IT); Giorgio Grimoldi, Fino Mornasco (IT)

(73) Assignee: D-ORBIT S.P.A., Fino Mornasco (IT)

( * ) Notice: Subject to any disclaimer, the term of this patent is extended or adjusted under 35 U.S.C. 154(b) by 1090 days.

(21) Appl. No.: 17/597,704

(22) PCT Filed: Jul. 16, 2020

(86) PCT No.: PCT/IB2020/056693
§ 371 (c)(1),
(2) Date: Jan. 19, 2022

(87) PCT Pub. No.: WO2021/014293
PCT Pub. Date: Jan. 28, 2021

(65) Prior Publication Data
US 2022/0274722 A1 Sep. 1, 2022

(30) Foreign Application Priority Data
Jul. 22, 2019 (IT) ........................ 102019000012498

(51) Int. Cl.
*B64G 1/24* (2006.01)
*B64G 1/36* (2006.01)
(Continued)

(52) U.S. Cl.
CPC ............. *B64G 1/244* (2019.05); *B64G 1/363* (2013.01); *B64G 1/366* (2013.01); *B64G 1/369* (2023.08);
(Continued)

(58) Field of Classification Search
CPC .......... B64G 1/244; B64G 1/36; B64G 1/361; B64G 1/363; B64G 1/365; B64G 1/366;
(Continued)

(56) References Cited

U.S. PATENT DOCUMENTS 4,374,579 A 2/1983 Renner et al.
4,824,052 A * 4/1989 Smay ..................... B64G 1/244
244/170

(Continued)

FOREIGN PATENT DOCUMENTS

CN 101451844 A 6/2009
CN 104859866 A 8/2015
(Continued)

OTHER PUBLICATIONS

Chinese First Office Action dated Sep. 23, 2023 for Chinese Patent Application No. 202080052547.X.
(Continued)

*Primary Examiner* — Timothy J Thompson
*Assistant Examiner* — Rhadames Alonzo Miller
(74) *Attorney, Agent, or Firm* — Husch Blackwell LLP

(57) ABSTRACT

A satellite module for attitude determination includes a containment body comprising at least one data acquisition board and a connection interface, at least one first-type sensor selected from a sun sensor, an earth sensor, a stellar sensor, a horizon sensor, in communication with the data acquisition board and at least one second-type sensor, different from the first type, selected from a sun sensor, an earth sensor, a stellar sensor, a horizon sensor, and in communication with the data acquisition board. The connection interface may be mounted on a first face of the containment body, the first-type sensor may be mounted on a second face of the containment body, and the second-type sensor may be mounted on a third face of the containment body.

20 Claims, 4 Drawing Sheets

(51) Int. Cl.
    *B64G 1/66*            (2006.01)
    *G01J 5/12*            (2006.01)
    *G01S 3/786*          (2006.01)

(52) U.S. Cl.
    CPC .................. *B64G 1/66* (2013.01); *G01J 5/12*
          (2013.01); *G01S 3/7862* (2013.01); *G01S*
                              *3/7867* (2013.01)

(58) Field of Classification Search
    CPC .......... B64G 1/369; B64G 1/66; G01S 5/163;
                      G01S 3/7862; G01S 3/7867
    See application file for complete search history.

(56)            References Cited

U.S. PATENT DOCUMENTS

| | | | | |
|---|---|---|---|---|
| 4,854,527 | A * | 8/1989 | Draim .................. | B64G 1/1007 |
| | | | | 244/158.4 |
| 5,014,936 | A | 5/1991 | Nauck | |
| 5,257,759 | A * | 11/1993 | Bender ................. | G01S 3/7862 |
| | | | | 244/168 |
| 5,698,842 | A * | 12/1997 | Fallon .................. | G01S 3/7861 |
| | | | | 250/203.4 |
| 5,721,431 | A * | 2/1998 | Hersom ................... | B64G 1/22 |
| | | | | 250/353 |
| 5,884,869 | A * | 3/1999 | Fowell ................... | B64G 1/363 |
| | | | | 701/13 |
| 6,066,850 | A * | 5/2000 | Hersom ................ | B64G 1/366 |
| | | | | 250/342 |
| 6,138,953 | A * | 10/2000 | Noyola ................. | B64G 1/285 |
| | | | | 244/164 |
| 2014/0209751 | A1* | 7/2014 | Stagmer ................ | B64G 1/244 |
| | | | | 244/165 |
| 2015/0021439 | A1* | 1/2015 | Duchemin .............. | B64G 1/42 |
| | | | | 244/171.1 |
| 2015/0166200 | A1* | 6/2015 | Kim .................... | H02K 41/025 |
| | | | | 310/90 |

| | | | | |
|---|---|---|---|---|
| 2015/0276913 | A1 | 10/2015 | Mehrl et al. | |
| 2015/0367966 | A1 | 12/2015 | Judd et al. | |
| 2019/0023424 | A1* | 1/2019 | Helvajian ............. | B64G 1/645 |
| 2022/0289407 | A1* | 9/2022 | Vedant ................... | B64G 1/244 |

FOREIGN PATENT DOCUMENTS

| | | | | |
|---|---|---|---|---|
| CN | 106114912 | A | 11/2016 | |
| JP | 56149300 | A | 11/1981 | |
| JP | 59032599 | A | 2/1984 | |
| JP | 60056700 | A | 4/1985 | |
| JP | 02151600 | A | 6/1990 | |
| JP | 2002131078 | A * | 5/2002 | .......... G01S 3/7867 |
| JP | 2009150870 | A | 7/2009 | |
| JP | 2014058176 | A | 4/2014 | |
| JP | 2015182504 | A | 10/2015 | |
| RU | 2020419 | C1 | 9/1994 | |
| RU | 2114770 | C1 | 7/1998 | |

OTHER PUBLICATIONS

Chinese Translation for Chinese Patent CN101451844A.
Wei et al., "Design & Realization of a High-performance Integrated Attitude Determination System and Hybrid Simulation", 2011 Second International Conference on Digital Manufacturing & Automation, pp. 355-360.
Hearing Notice issued in Indian Application No. 202247000621 issued Feb. 4, 2025.
Chinese Office Action dated Aug. 21, 2024 for Chinese Patent Application No. 202080052547.X.
Russian Office Action dated Dec. 11, 2023 for Russian Application No. 2022104380/11.
Machine Translation for RU2020419C1.
Machine Translation for RU2114770C1.
Office Action dated Jan. 23, 2024 for Japaneses Application No. 2022-504218.

* cited by examiner

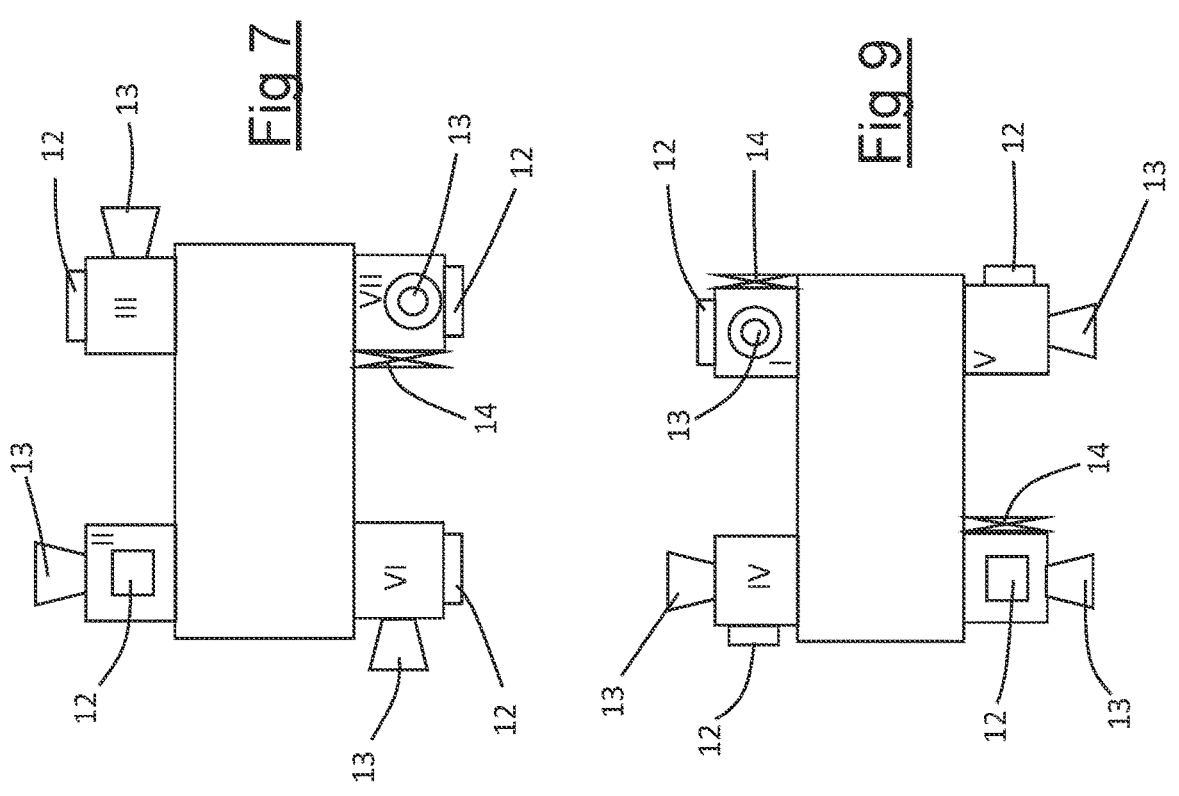
_Fig. 7_
_Fig. 9_
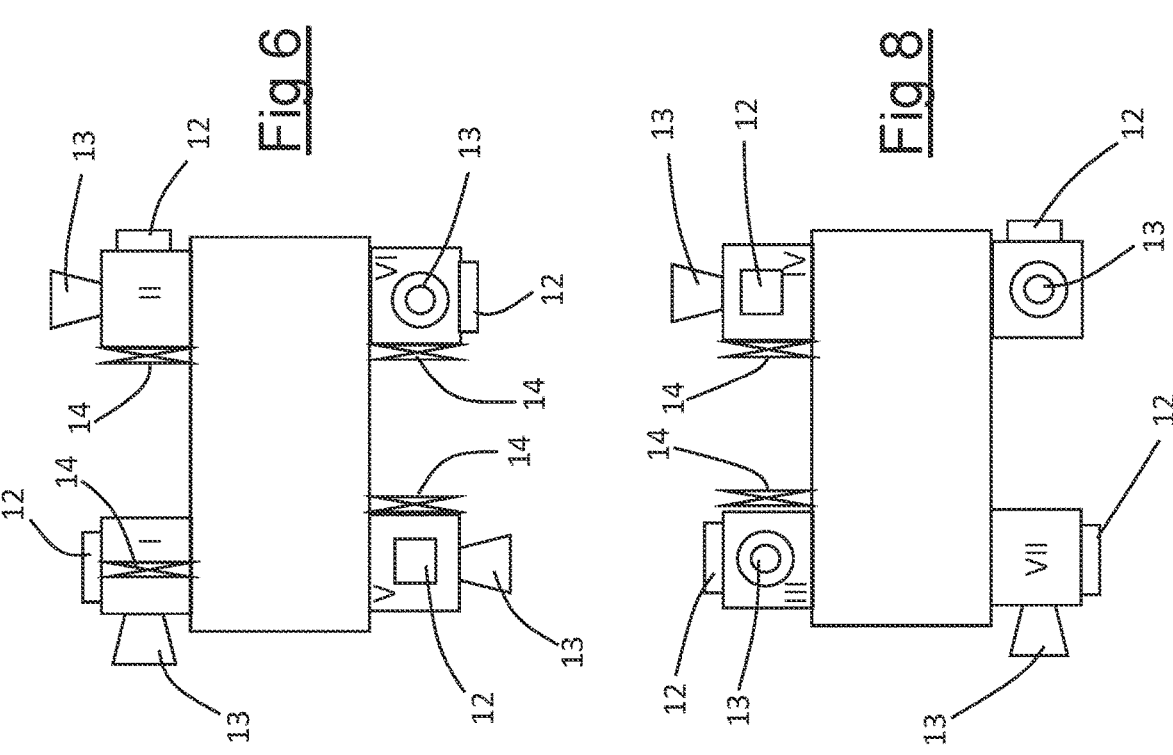
_Fig. 6_
_Fig. 8_

SATELLITE MODULE FOR ATTITUDE DETERMINATION

CROSS REFERENCES

This application is a U.S. National Phase Application of International Application No. PCT/IB2020/056693 filed on Jul. 16, 2020, which claims priority to Italian Application No. 102019000012498 filed on Jul. 22, 2019, the disclosures of which are incorporated by reference herein in their entirety.

TECHNICAL FIELD

The present invention relates to a satellite module for attitude determination, i.e. for determining how a satellite is oriented in space. The attitude determination module (AD) can be used as part of an Attitude Determination and Control System (ADCS) in a satellite.

BACKGROUND

ADCS systems determine the attitude of a satellite in order to set and/or correct the attitude in such a way that the satellite is able to accomplish the mission for which it was placed in orbit or launched into space.

The AD attitude determination is usually entrusted to sensors and processors capable of measuring and processing specific physical quantities to process accurate information on the spatial orientation of the satellite with respect to a relative reference system (for example integral with the satellite or to the earth) or to a system of inertial reference (for example integral with the stars).

The sensors typically used for the attitude determination are magnetometers that measure the intensity and direction of the earth's magnetic field, gyroscopes, sun sensors that identify the direction and/or position of the sun, stellar sensors that identify and recognize a set of stars, earth sensors that identify a direction pointing towards the centre of the earth and horizon sensors that identify the earth's horizon.

By combining together the information coming from two or more of said sensors (preferably from at least three of said sensors) it is possible to determine the orientation in space of the satellite.

The sensors are mounted on board the satellite so that they can perform their function during the operating life or mission of the satellite.

Since each type of sensor is designed to detect a specific quantity, each sensor is usually a stand alone sensor, that is to say it is a sensor capable of operating independently of the other sensors, and requires a dedicated connection for interacting with the ADCS system both in terms of electrical power supply (when necessary for sensor operation) and in terms of data transmission.

Each type of sensor is installed on the satellite in the most suitable position for detecting, during the mission, the specific information for which it was designed.

The Applicant has noted that the positioning of the sensors of the AD system is therefore very critical and very often needs to previously know the details of the mission to be carried out by the satellite as well as the attitude that the satellite will have to assume during the mission.

By way of example, the Applicant has verified that since the terrestrial globe has an angular diameter of about 85 degrees at a distance of about 500 Km from the earth's surface, the stellar sensor (typically a camera or a telecamera) typically has a very small field of view (FOV), for example having an angular diameter comprised between 4 degrees and 7 degrees, in order to guarantee to frame a portion of stars, however small, not influenced by the terrestrial globe, the sun or the terrestrial albedo.

Given the limited field of view of the stellar sensor, it is necessary to carefully choose the portion of the satellite on which to install the stellar sensor, making sure that during the mission the stellar sensor is not turned towards the earth but that it is turned on the opposite side with respect to the earth. In the case of particular missions, it may be necessary to install more than one stellar sensor with a very significant burden both in terms of design (it is necessary to provide for additional dedicated connections for the additional stellar sensors) and in terms of costs. In this regard, the Applicant has in fact verified that the stellar sensor must be very sensitive (and therefore expensive) in order to discern also dimly lit stars, since it is not possible to guarantee a priori that the portion of stars framed within the limited field of view include bright stars.

Similarly, the Applicant has verified that since the angular diameter of the sun, seen from the vicinity of the earth, is about 0.5 degrees, the sun sensor must be carefully positioned to prevent the terrestrial albedo from masking or otherwise distorting the reading of the sun sensor. In any case, it is often necessary to correct the reading of the sun sensor in order to take into account the terrestrial albedo by resorting to mathematical models that try to describe the terrestrial albedo when the seasons vary and when the relative position changes with respect to the earth. These mathematical models, in addition to requiring a high computational cost from the AD system, are not always reliable and cannot take into account events that are not considered in the mathematical model but which are able to influence the real albedo. Even in the case of sun sensors it is therefore sometimes necessary to prepare and install more than one sensor on the satellite in order to be able to guarantee to determine the position of the sun, with an increase in terms of design and, at least in part, of costs.

Similar considerations also apply to the other types of sensors used in the AD system.

Therefore, in the Applicant's experience, each satellite requires a dedicated attitude determination system that is specifically designed and built to be able to operate on the specific satellite and for the specific mission.

The Applicant has perceived that by increasing the number of sensors installed on the satellite, the flexibility in positioning them increases and the information relating to the mission and the attitude that the satellite will have to assume during the mission decreases.

However, the Applicant has noted that this entails a greater expenditure in terms of dedicated connections which are necessary to ensure the correct operation of the sensors themselves, complicating the design of the AD system of the satellite and making the integration of the sensors in the satellite even more critical.

However, the Applicant has perceived that by making a heterogeneous group of sensors of the AD system independent and autonomous, it would be possible to operate this heterogeneous group of sensors as an independent satellite module requiring a single data connection and a single electricity connection for the correct operation of the whole module. In this way the design complexity for integrating the sensors in the satellite would be significantly reduced.

The Applicant has also perceived that by equipping said satellite module with at least two sensors of different type oriented differently from each other, i.e. oriented in different directions, it is possible to equip the satellite with more satellite modules identical to each other but oriented to each other differently so that each type of sensor can have, overall, an observation field of any angular diameter, even 360 degrees.

The Applicant also perceived that such a satellite module would considerably decrease the cost of the AD system. In fact, with even a single type of AD satellite module, it would be possible to equip any satellite, allowing a large-scale production of AD satellite modules that are identical between them. Even if different types of satellite modules are to be envisaged, each of them equipped with specific sensors, it would be possible to massively produce each type of AD satellite module and choose, from time to time, the satellite modules to be used.

SUMMARY

The present invention therefore relates, in a first aspect, to a satellite module for attitude determination that includes a polyhedral containment body configured to be mounted on a satellite and comprising at least one data acquisition board and a connection interface for allowing the data acquisition board to be in signal communication and electrical communication with the satellite; at least one first-type sensor selected from a sun sensor, an earth sensor, a stellar sensor, a horizon sensor, in communication with the data acquisition board and at least one second-type sensor, different from the first type, selected from a sun sensor, an earth sensor, a stellar sensor, a horizon sensor, and in communication with the data acquisition board; wherein the connection interface is mounted on a first face of the polyhedral containment body, the first-type sensor is mounted on a second face of the polyhedral solid body, and the second-type sensor is mounted on a third face of the polyhedral solid body.

The present invention relates, in a second aspect, to a satellite comprising at least two satellite modules, preferably at least four satellite modules, even more preferably eight satellite modules, in accordance with the first aspect of the invention.

The polyhedral containment body allows the satellite module to arrange surfaces (faces), differently oriented between them, that can be used to mount sensors of different types which are then mounted on the containment body so as to be oriented to each other in a different way.

The data acquisition board allows collecting the electrical signals coming from the sensors. The data acquisition board can further comprise a circuit for conditioning the received signal to convert said signal into digital values, possibly making use of an analogue-digital converter. The data acquisition board may further comprise or be in signal communication with a microcontroller configured to process the digital signal and generate an output configured to be received by the satellite attitude control system. The microcontroller can be mounted in the containment body or can be mounted in the satellite outside the containment body.

The connection interface allows exchanging signals between the data acquisition board and the satellite attitude control system and allows energizing the data acquisition board and possibly the sensors (if the sensors need an electrical power supply).

The connection interface may be a single connection plug or may comprise multiple connection plugs. In any case, the connection interface is mounted on a face of the containment body that is different from the faces that house the sensors, so that when the module is connected with the satellite, the field of view of the sensors is not compromised.

The satellite module is therefore configured as an autonomous and independent module, that is to say as an independent satellite module that requires a single data connection and a single electricity connection for the correct operation of the sensors.

The term "polyhedral body" refers in the present description and in the following claims to a body defined by a finite number of polygons, in which each polygon defines a face, and in which the intersection of two faces is an edge or a vertex, each edge belonging only to two faces, two adjacent faces not being coplanar. Each polygon is preferably contained in a plane. Alternatively, at least one or all of the polygons may not be plane but they can be curved surfaces.

The term "satellite" refers in the present description and in the following claims to any vehicle capable of moving in space or in the upper atmosphere, including objects orbiting around a celestial body and spacecrafts capable of travelling in space or around an orbit.

The term "angular diameter" (ad), when referring to a field of view, in the present description and in the following claims means the measurement of the diameter (d) of the circle of smaller diameter capable of circumscribing an object entirely included in the field of view, with respect to the distance (D) from the observer, according to the formula $ad=2*arctan (d/2*D)$.

The present invention, according to the first or second aspect, can comprise, individually or in combination, one or more of the following characteristics.

Preferably, the first-type sensor comprises an earth sensor or a sun sensor.

Preferably, the second-type sensor is a stellar sensor.

The Applicant has verified that by equipping a satellite with at least two identical satellite modules and by differently orienting the polyhedral containment body of one satellite module with respect to the other one, it is possible, depending on the shape of the satellite, to obtain fields of view for each type of sensor capable of ensuring a correct reading of the respective quantities regardless of the attitude assumed by the satellite.

In any case, the Applicant has verified that it is always possible, whatever the shape of the satellite, to choose a number of satellite modules that guarantee field of views for each type of sensor capable of ensuring a correct reading of the respective quantities regardless of the attitude assumed by the satellite.

By way of example, by placing eight satellite modules at the eight vertices of a cuboid-shaped satellite, it is possible to orient each module so that both the first-type sensors and the second-type sensors are oriented perpendicularly to the six faces of the cuboidal satellite, with also at least two sensors of each type oriented redundantly.

In this way, it is not necessary to know a priori the mission details and the attitude that the satellite will have to assume in order to correctly equip the satellite with an AD system.

The Applicant has also perceived that the satellite module according to the present invention allows to use stellar sensors having a very low cost.

In fact, the stellar sensors that are usually used have a very small field of view (FOV) (angular diameter between 4 degrees and 7 degrees) and therefore need to be very sensitive, and therefore expensive, in order to detect a sufficient number of stars or sufficiently bright stars to proceed with a comparison with a stellar catalogue.

The Applicant has noted that by mounting the satellite modules on the satellite in such a way that each stellar sensor is pointed in a different direction from the others, the probability that there is at least one stellar sensor not turned towards the earth or the sun is very high regardless of the attitude assumed by the satellite. By arranging eight satellite modules at the eight vertices of a satellite (for example a cubic shaped satellite), the probability that there is at least one stellar sensor not turned towards the earth or the sun is 100%.

Therefore, the Applicant has noted that the field of view of the stellar sensor can be greatly increased, since even in the face of a high field of view it is substantially certain that at least one stellar sensor is framing a portion of space that does not include the earth or the sun.

The Applicant has perceived that by increasing the field of view of the stellar sensor it is possible to decrease the sensitivity thereof (and therefore decrease the cost of the stellar sensor), since it is very likely that with a wide field of view a sufficient number of very bright stars will always be framed so as to proceed with the comparison with a stellar catalogue.

The Applicant has also perceived that by using a stellar sensor with a wide field of view and low sensitivity it is also possible to reduce the energy expenditure of the AD system.

In fact, the portion of stars framed by a stellar sensor with a reduced field of view must be compared with very accurate stellar catalogues in order to be sure of being able to recognise the small portion of stars framed. Typically, a stellar sensor with a field of view having an angular diameter of about 4 degrees requires a stellar catalogue of hundreds of thousands of stars. The computational cost for comparing the portion of stars framed with said stellar catalogue is very expensive and requires a considerable amount of electricity, up to a few tens of Watts, to power the processors implemented for the comparison.

On the contrary, the Applicant has noted that the portion of stars framed by a stellar sensor with a wide field of view can be compared with much less accurate stellar catalogues. The Applicant has verified that a stellar catalogue containing a few hundred stars is sufficient, for example about 500 stars. Therefore, the computational cost for the comparison is very low and requires much less energy.

Preferably, the stellar sensor has a field of view having an angular diameter higher than 15 degrees.

Even more preferably, the stellar sensor has a field of view having an angular diameter between about 20 degrees and about 60 degrees, preferably of about 40 degrees.

Preferably, the first-type sensor has a field of view having an angular diameter of at least 60 degrees.

Preferably, the satellite module comprises a third-type sensor, different from the first and second types, mounted on a fourth face of the polyhedral containment body.

The third-type sensor increases the accuracy in attitude determination as it provides additional data, based on a different measured quantity, which can be processed to determine the attitude.

Furthermore, by mounting the third-type sensor on a fourth face of the polyhedral body it is possible to acquire data that are useful for the attitude determination even if the first-type or second-type sensors are darkened (for example because an object passes in front of the second or the third face of the containment body darkening the field of view of the relative sensor).

Preferably, the third-type sensor is selected from a sun sensor, an earth sensor, a horizon sensor.

By way of example, when the first-type sensor is an earth sensor, the third-type sensor is a sun sensor.

Preferably, both a first-type sensor and a third-type sensor are mounted on the second face and on the fourth face.

In this way, it is possible to obtain the measurement of two different quantities (for example a vector directed towards the centre of the earth and a vector directed towards the sun) simultaneously, increasing the accuracy in the attitude determination.

Preferably, the polyhedral containment body comprises a top face and a front face between which a plurality of connecting faces extend; said second face or said fourth face being identified by two of said plurality of connecting faces.

In other words, between two substantially perpendicular faces of the containment body, such as for example a front face and a top face, connecting faces are provided which, starting from a first face (ed. the top face) slope down until they connect with the other face (ed. the front face). In said configuration, the first-type and the third-type sensors are placed on at least two of said connecting faces.

Preferably, the plurality of connecting faces comprises four connecting faces, each of which forms an angle between 10 degrees and 25 degrees with an adjacent connecting face.

Preferably, at least one first-type sensor is mounted on each connecting face.

This allows, depending on the number of connecting faces, to have redundant readings of the quantity to which the first type of sensor is sensitive. In this way, any systematic errors of a sensor, parallax errors or other types of measurement errors can be corrected by a statistical processing of the collected data.

Preferably, both a first-type sensor and a third-type sensor are mounted on each connecting face.

This allows to reduce both the measurement error and to increase the accuracy in the attitude determination.

Preferably, said polyhedral containment body comprises a lateral face and at least one intermediate face which extends between the lateral face and the front face; at least one first-type or third-type sensor being mounted on said intermediate face.

The lateral face and the front face are placed below the top face and are preferably substantially perpendicular to each other and substantially perpendicular to the top face. The at least one (preferably two) intermediate face extend from the lateral face and slopes down until it connects with the front face. In this configuration, the third-type sensors are placed on at least two of said connecting faces.

Preferably, two intermediate faces are provided wherein a first intermediate face forms an angle between 20 degrees and 40 degrees with a second intermediate face.

BRIEF DESCRIPTION OF THE DRAWINGS

Further characteristics and advantages of the present invention will become clearer from the following detailed description of preferred embodiments thereof, with reference to the appended drawings and provided by way of an indicative and non-limiting example. In such drawings:

FIG. 3 is a schematic perspective view of a satellite comprising eight satellite modules according to the present invention; and FIGS. 4 to 9 are bottom, top and side views of the satellite of FIG. 3.

DETAILED DESCRIPTION

Figure 1:
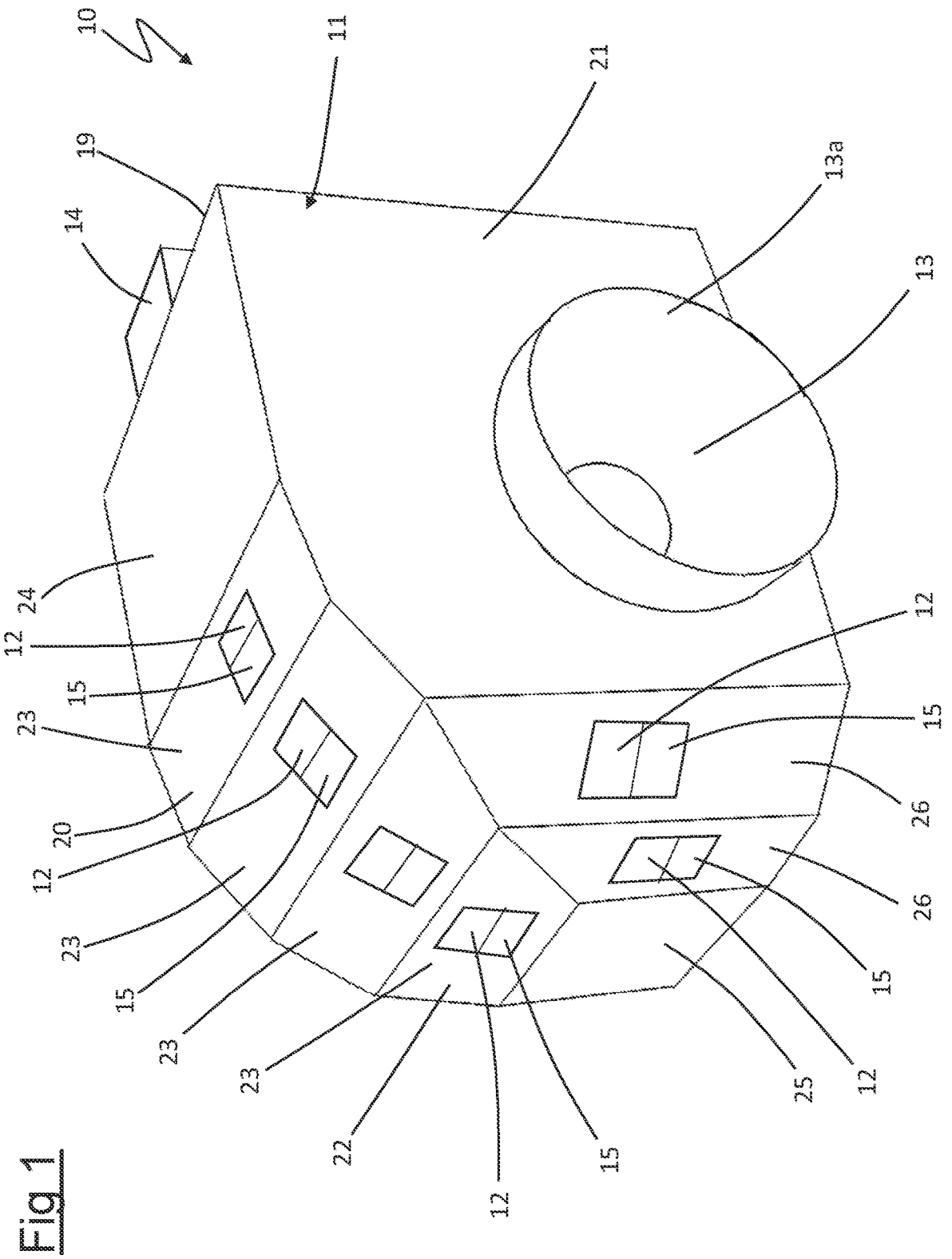
FIG. 1 is a schematic perspective view of a satellite module according to the present invention.

With reference to the accompanying figures, a satellite module according to the present invention is generally indicated with the number 10.

The satellite module comprises a containment body 11 made of metallic material, for example of aluminium, aluminium alloy or titanium. In the preferred embodiment of the invention, the containment body can be inscribed in a cube having a smaller side of 10 centimetres, preferably of about 5 centimetres.

At least one first-type sensor 12, at least one second-type sensor 13 and at least one connection interface 14 are constrained to the containment body 11.

In the preferred embodiment of the invention, at least one third-type sensor 15 is also constrained to the containment body 11.

The first, second and third types of sensors (when the third type of sensors are present) belong to sensors that need to be directly exposed to, i.e. directly in view of, the quantity to be measured. The first-type sensor 12, the second-type sensor 13 and the third-type sensor 15 (when present) are mounted on external surfaces of the containment body 11 so that the respective devices sensitive to the quantity to be measured face the environment outside the containment body 11.

In the preferred embodiment of the invention, the first-type sensor 12 is a sun sensor, i.e. a sensor capable of providing the direction which connects the sun to the sensor itself. By way of example, the sun sensor 12 can be a photodiode (or an array of photodiodes) or a photodetector (or an array of photodetectors) capable of transforming an incident light into an electrical signal which is subsequently processed and compared to determine the direction of the incident light. The angular diameter of the field of view of the sun sensor 12 is between 60 degrees and 90 degrees, preferably of about 80 degrees.

The second-type sensor 13 of sensors is a stellar sensor, that is to say a sensor that detects the position of the stars through photocells or photographic equipment. The stellar sensor 13 comprises, in the preferred embodiment of the invention, an optical head 13a equipped with a baffle 13b (see FIG. 1) and electronics 13c (FIG. 2) configured to process the detected images and compare them with a preloaded stellar catalogue containing less than 1000 stars. The angular diameter of the field of view of the stellar sensor 13 is greater than 15 degrees, preferably between 20 degrees and 60 degrees, even more preferably of about 40 degrees.

The third-type sensor 15 is an earth sensor, that is to say a sensor capable of detecting the position of the earth with respect to the satellite. In the preferred embodiment of the invention, the earth sensor 15 is an infrared thermopile. The angular diameter of the field of view of the earth sensor 15 is between 60 degrees and 90 degrees, preferably of about 80 degrees.

Inside the containment body 11 there is also provided at least one further sensor 16 of a fourth type different from the first, second and third type of sensors.

The fourth-type sensor 16 is selected from the group comprising a magnetometer and a gyroscope. In the preferred embodiment of the invention, two fourth-type sensors 16 are provided, in particular a magnetometer and a gyroscope. The magnetometer is configured to measure the module of the earth's magnetic field or to measure the component of the earth's magnetic field along one or more directions. The gyroscope is an electronic gyroscope, for example a Mems gyroscope and is able to detect changes in orientation of the satellite.

Figure 2:
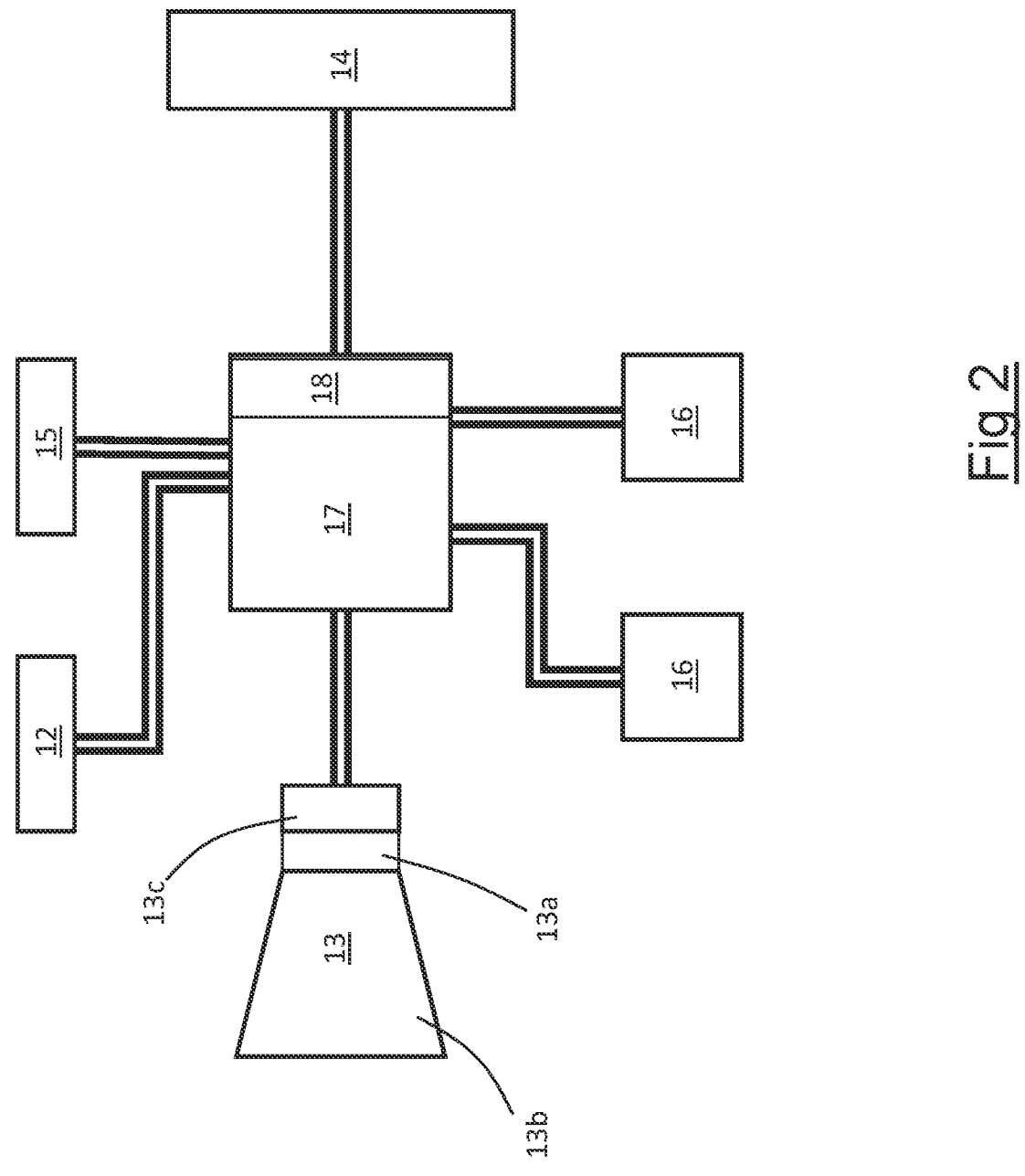
FIG. 2 is a functional schematic view of some parts of the satellite module of FIG. 1.

As shown schematically in FIG. 2, a data acquisition board 17 is provided inside the containment body 11 placed in signal communication with the sensors of the first 12, second 13, third 15 and fourth type 16 in order to receive electrical signals from the sensors themselves.

In the preferred embodiment of the invention, the data acquisition board 17 integrates (or can be in signal communication with) a microcontroller 18 configured to process the electrical signals acquired by the sensors and generate output signals configured to be received by the satellite attitude control system and processed to change the satellite attitude.

The data acquisition board 17 is in signal connection and in electrical connection with the connection interface 14 to receive from it an electrical power supply, for example at 5V DC, taken from on-board systems of the satellite and to receive the output signals generated by the microcontroller 18. The data acquisition board 17 is also in electrical connection with one or more of the sensors to power them.

The connection interface 14 is configured to connect to a satellite connector to integrate the satellite module 11 into the ADCS system of the satellite.

As represented in FIG. 1, the containment body 11 is externally polyhedral in shape, so as to comprise a plurality of faces oriented differently from each other.

In particular, the containment body 11 comprises a first face 19 on which the connection interface 14 is mounted, a second face 20 on which the first-type sensor 12 is mounted, a third face 21 on which the second-type sensor 13 is mounted and a fourth face 22 on which the third-type sensor 15 is mounted.

In the embodiment shown in FIG. 1, the sun sensor 12 is mounted on the second face 20, the stellar sensor 13 is mounted on the third face 21 and the earth sensor 15 is mounted on the fourth face 22.

The second 20 and the fourth face 22 are faces of the containment body 11 which belong to a plurality of connecting faces 23 which extend between a top face 24 and a front face 25 of the containment body 11.

The front face 25 and the top face 24 are substantially perpendicular to each other.

In the embodiment of FIG. 1, the connecting faces 23 are four, they are consecutive to each other and uniformly connect the top face 24 and the front face 25. Each connecting face forms an angle of about 18 degrees with the previous and/or next connecting face. The connecting face 23 immediately adjacent to the front face 25 forms an angle of about 18 degrees with the front face 25 and the connecting face 23 immediately adjacent to the top face 24 forms an angle of about 18 degrees with the top face 24.

The connecting faces 23 are preferably plane and the top 24 and front 25 faces also are preferably planet.

The first face 19 defines a rear face of the containment body 11. The rear face 19 is opposite to the front face 25 and is preferably parallel to the front face 25.

The third face 21 defines a lateral face for the containment body 11. The lateral face 21 is substantially perpendicular to the top face 24 and the front face 25. As illustrated in FIG. 1, the lateral face 21 is also substantially perpendicular to the rear face 19.

Two intermediate faces 26 extend between the lateral face 21 and the front face 25. The intermediate faces 26 are consecutive to each other and uniformly connect the lateral face 21 and the front face 25. The intermediate faces 26 form an angle of about 33 degrees between them. The intermediate face 26 immediately adjacent to the front face 25 forms an angle of about 33 degrees with the front face 25 and the intermediate face 26 immediately adjacent to the lateral face 21 forms an angle of about 33 degrees with the lateral face 21. The intermediate faces 26 are preferably plane. The intermediate faces 26 also form an edge with two connecting faces 23, in particular they form an edge with the two consecutive connecting faces 23 that are the closest to the front face 25.

In the preferred embodiment of the invention, an earth sensor 15 and a sun sensor 12 are mounted on each connecting face 23, as illustrated in FIG. 1. Preferably, an earth sensor 15 and a sun sensor 12 are also mounted on both intermediate faces 26.

The satellite module 10 creates a stand alone unit capable of operating autonomously and independently of other satellite modules 10.

Figures 3, 4, 5:
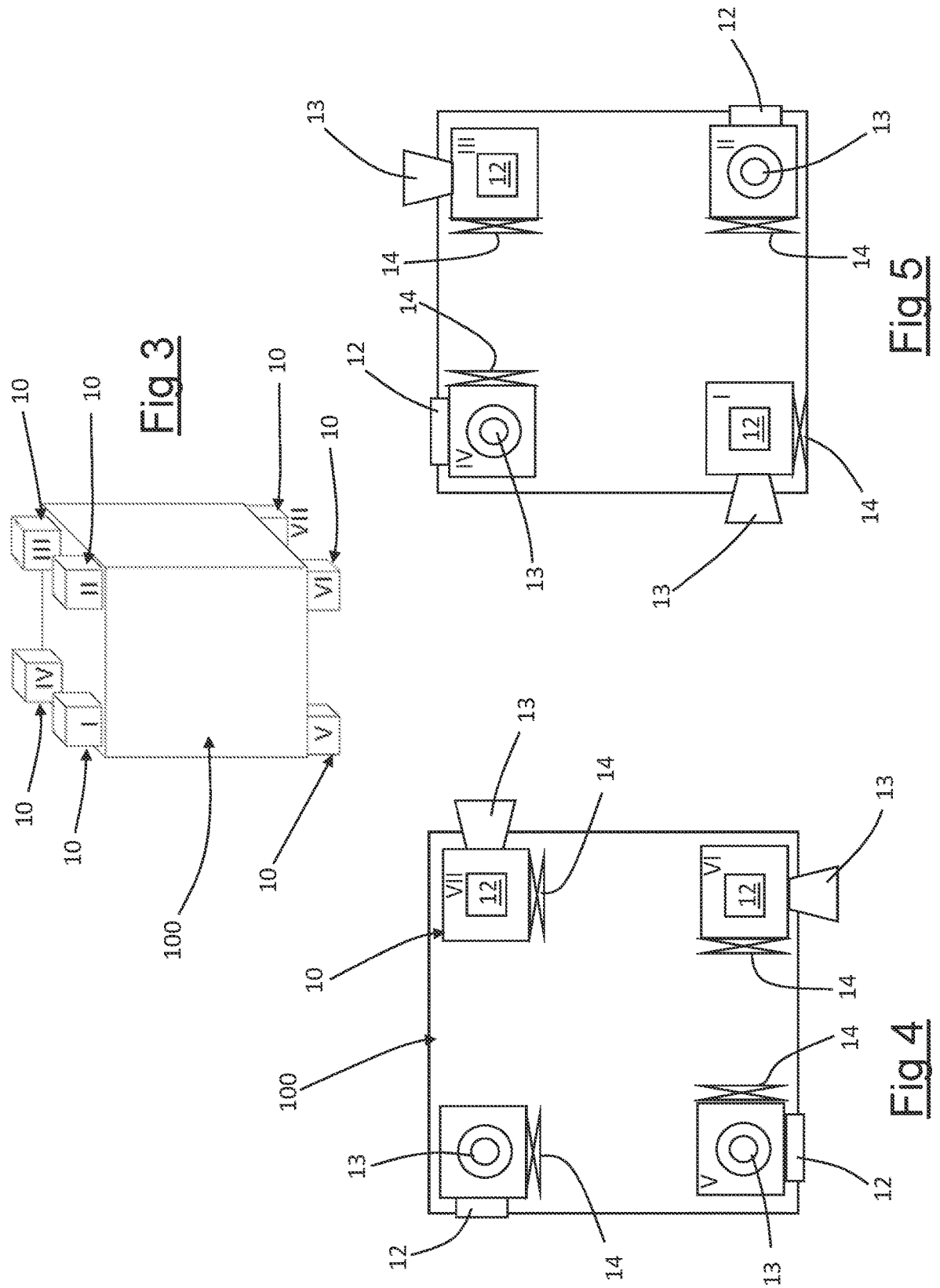

FIG. 3 shows a possible and preferred application of a plurality of satellite modules 10 on a satellite 100, for example a cubic-shaped satellite or in any case a satellite having eight edges.

For display convenience, the satellite modules 10 with which the satellite 100 is equipped have been represented with Roman numerals I to VII to distinguish them from each other despite being identical.

Eight satellite modules 100 which are identical to each other but differently oriented between them are mounted on the satellite 100. The satellite modules 10 are mounted at the eight edges of the satellite 100.

FIG. 4 shows a bottom view of the satellite 100 of FIG. 3 with the orientations of the various sensors mounted on the containment body 11 highlighted. For display convenience, a single stellar sensor 13, a single sun sensor 12 and a connection interface 14 have been represented. Furthermore, the containment body 11 has been represented cubic in shape. In any case, in accordance with the satellite module described above, the containment body 11 comprises a first face on which the connection interface 14 is mounted, a second face on which a sun sensor 12 is mounted and a third face on which a stellar sensor 13 is mounted. A person skilled in the art will easily understand that the following also applies to a satellite module 10 whose containment body 11 and whose sensor arrangement is identical to the satellite module of FIG. 1.

FIG. 5 is a top view of the satellite 100 of FIG. 3 and FIGS. 6 to 9 are side views of the satellite 100 of FIG. 3.

The satellite module 10 indicated by the Roman numeral V in FIG. 4 has been represented with the stellar sensor 13 which is directed towards the viewer of the figure and the sun sensor 12 has been represented directed downwards for the viewer of the figure. The satellite module 10 indicated by the Roman numeral VI in FIG. 4 has been represented with the stellar sensor 13 which is directed downwards for the viewer of the figure and the sun sensor 12 has been represented directed towards the viewer of the figure. The satellite module 10 indicated by the Roman numeral V in FIG. 4 has been represented with the stellar sensor 13 which is directed to the right of the viewer of the figure and the sun sensor 12 has been represented directed towards the viewer of the figure. The satellite module 10 with no Roman numeral indication in FIG. 4 has been represented with the stellar sensor 13 which is directed towards the viewer of the figure and the sun sensor 12 has been represented directed to the left of the viewer of the figure.

Identical symbols to represent the orientation of the sun sensor 12 and the stellar sensor 13 have been adopted in figures from 5 to 9.

As can be appreciated from FIGS. 4 to 9, for each side of the satellite 100 there is at least one stellar sensor 13 which has its own field of view directed moving away from this side.

Likewise, for each side of the satellite 100 there is at least one sun sensor 12 which has its own field of view directed moving away from this side.

In this way, whatever the attitude of the satellite 100 during a mission, there is always at least one stellar sensor 13 whose field of view frames only stars and at least one sun sensor whose field of view only frames the sun.

In the case of a satellite module whose containment body 11 is like that represented in FIG. 1, regardless of the attitude of the satellite 100 during a mission, there will always be at least one stellar sensor 13 whose field of view frames only stars and at least four sun sensors and four earth sensors whose respective field of views only frame the sun and earth.

This obtained minimum redundancy of the sensors that simultaneously measure the same quantity (for some attitudes the numbers of sensors of the same type that are measuring the same quantity can be even greater) allows the use of sensors with reduced sensitivity and also allows to correct or in any case to filter incorrect readings of other sensors.

Furthermore, the obtained redundancy of sensors that simultaneously measure the same quantity allows to have a slow degradation in the attitude determination of the satellite 100, since a possible failure of a sensor is compensated by the redundant sensors obtaining, for each sensor failure, a small degradation in the accuracy of the attitude determination (at least as long as at least one of the sensors continues to work).

The invention claimed is:

1. A satellite module for attitude determination comprising:

a polyhedral containment body configured to be mounted on a satellite and comprising at least one data acquisition board and a connection interface for allowing the data acquisition board to be in signal communication and electrical communication with the satellite;

at least one first-type sensor selected from a sun sensor, an earth sensor, a stellar sensor, and a horizon sensor, in communication with the data acquisition board and at least one second-type sensor, different from the at least first type-sensor, selected from a sun sensor, an earth sensor, a stellar sensor, and a horizon sensor, and in communication with the data acquisition board; and wherein the connection interface is mounted directly on a first face of the polyhedral containment body, the at least one first-type sensor is mounted directly on a second face of the polyhedral containment body, and the at least one second-type sensor is mounted directly on a third face of the polyhedral containment body.

2. The satellite module according to claim 1, wherein the at least one first-type sensor comprises an earth sensor or a sun sensor and wherein the at least one second-type sensor comprises a stellar sensor.

3. The satellite module according claim 1, wherein the first-type sensor has a field of view having an angular diameter of at least 60 degrees.

4. The satellite module according to claim 2, wherein the stellar sensor has a field of view having an angular diameter higher than 15 degrees.

5. The satellite module according to claim 1, comprising at least one third-type sensor, different from the at least one first-type sensor and the at least one second-type sensor, directly mounted on a fourth face of the polyhedral containment body, the at least one third-type sensor being selected from a sun sensor, an earth sensor, and a horizon sensor.

6. The satellite module according to claim 5, wherein both one of the at least one first-type sensor and one of the at least one third-type sensor are mounted on the second face and on the fourth face.

7. The satellite module according to claim 5, wherein the polyhedral containment body comprises a top face and a front face, between which a plurality of connecting faces extend; the second face or the fourth face being identified by two of said plurality of connecting faces, wherein one of the at least one first-type sensor is mounted directly on each connecting face of said plurality of connecting faces.

8. The satellite module according to claim 7, wherein both one of the at least one first-type sensor and one of the at least one third-type sensor are directly mounted on each of the plurality of connecting faces.

9. The satellite module according to claim 7, wherein the plurality of connecting faces comprises four connecting faces, each of the four connecting faces forming an angle between 10 degrees and 25 degrees with an adjacent connecting face, and wherein each of the at least one first-type sensor is oriented according to an orientation of the connecting face that the at least one first-type sensor is mounted on.

10. The satellite module according to claim 7, wherein the polyhedral containment body comprises a lateral face and at least one intermediate face which extends between the lateral face and the front face; at least one of the at least one first-type sensor or at least one of the at least one third-type sensor being directly mounted on the intermediate face.

11. The satellite module according to claim 10, comprising two intermediate faces, wherein a first intermediate face forms an angle between 20 degrees and 40 degrees with a second intermediate face, at least one of the at least one first-type sensor or at least one of the third-type sensor being directly mounted on each intermediate face and oriented according to an orientation of the intermediate face.

12. A satellite of cuboidal shape and having six faces and eight vertices, comprising:
    at least eight satellite modules according to claim 1 placed at the eight vertices of the satellite;
    each satellite module being oriented so that both the at least one first-type sensor and the at least one second-type sensor are oriented perpendicularly to the six faces of the satellite;
    wherein the at least one first-type sensor comprises at least two first-type sensors oriented redundantly; and
    wherein the at least one second-type sensor comprises at least two second-type sensors oriented redundantly.

13. The satellite module according to claim 5, wherein the at least one first-type sensor, the at least one second-type sensor, and the at least one third-type sensor are mounted externally on the polyhedral containment body so as to face an environment outside of the polyhedral containment body.

14. A satellite module for attitude determination, comprising:
    a polyhedral containment body configured to be mounted on a satellite and comprising at least one data acquisition board and a connection interface for allowing the at least one data acquisition board to be in signal communication and electrical communication with the satellite;
    at least one first-type sensor selected from a sun sensor, an earth sensor, a stellar sensor, and a horizon sensor, in communication with the data acquisition board;
    at least one second-type sensor, different from the at least one first type sensor, selected from a sun sensor, an earth sensor, a stellar sensor, and a horizon sensor, and in communication with the data acquisition board;
    at least one third-type sensor, different from the at least one first-type sensor and the at least one second-type sensor, selected from a sun sensor, an earth sensor, and a horizon sensor;
    wherein the connection interface is mounted on a first face of the polyhedral containment body, the at least one first-type sensor is mounted on a second face of the polyhedral containment body, the at least one second-type sensor is mounted on a third face of the polyhedral containment body, and the at least one third-type sensor is mounted on a fourth face of the polyhedral containment body; and
    wherein the first-type sensor, the second-type sensor, and the third-type sensor are mounted externally on the polyhedral containment body so as to face an environment outside the polyhedral containment body.

15. A satellite module for attitude determination comprising:
    a polyhedral containment body comprising a top face, a front face perpendicular to the top face, a lateral face perpendicular to the front face and the top face, and a plurality of connecting faces extending between the top face and the front face consecutive to each other, each connecting face of said plurality of connecting faces forming an angle between about 10 degrees and about 25 degrees with an adjacent connecting face of said plurality of connecting faces;
    a plurality of first-type sensors, each selected from a sun sensor, an earth sensor, a stellar sensor, and a horizon sensor, at least one first-type sensor of said plurality of first-type sensors being mounted directly on each connecting face so as to have redundant readings of a quantity to which the plurality of first-type sensors are sensitive; and
    at least one second-type sensor different from the plurality of first type sensors, said at least one second-type sensor being selected from a sun sensor, an earth sensor, a stellar sensor, and a horizon sensor, the at least one second-type sensor being mounted directly on the lateral face.

16. The satellite module of claim 15, wherein the polyhedral containment body comprises at least two intermediate faces extending between the lateral face and the front face consecutive to each other, each of the at least two intermediate faces forming an angle between about 20 degrees and about 40 degrees with an adjacent intermediate face of the at least two intermediate faces; and
    wherein at least one of the plurality of first-type sensors is mounted directly on each intermediate face of the at least two intermediate faces.

17. The satellite module of claim 15, comprising a plurality of third-type sensors, different from the plurality of first-type sensors and the at least one second-type sensor, selected from a sun sensor, an earth sensor, and a horizon sensor, wherein the at least one third-type sensor of said plurality of third-type sensors is mounted directly on each connecting face.

18. The satellite module of claim 16, comprising a plurality of third-type sensors, different from the plurality of first-type sensors and the at least one second-type sensor, selected from a sun sensor, an earth sensor, and a horizon sensor, wherein at least one of the plurality of first-type sensors is mounted directly on each connecting face and on each intermediate face.

19. The satellite module of claim 15, wherein the poly-hedral containment body comprises a rear face, opposite to the front face; and the satellite module further comprises one or more detach-able connection plugs directly mounted on the rear face and configured to connect to a satellite connector to integrate the satellite module into an attitude determi-nation control system of the satellite.

20. The satellite module of claim 19, wherein the rear face is parallel to the front face.

\* \* \* \* \*